(12) United States Patent
Ross

(10) Patent No.: US 9,137,189 B2
(45) Date of Patent: Sep. 15, 2015

(54) PROVIDING DISTRIBUTED DYNAMIC ROUTING USING A LOGICAL BROKER

(75) Inventor: Theodore L. Ross, Littleton, MA (US)

(73) Assignee: Red Hat, Inc., Raleigh, NC (US)

( * ) Notice: Subject to any disclaimer, the term of this patent is extended or adjusted under 35 U.S.C. 154(b) by 281 days.

(21) Appl. No.: 13/071,243

(22) Filed: Mar. 24, 2011

(65) Prior Publication Data

US 2012/0246241 A1   Sep. 27, 2012

(51) Int. Cl.

| G06F 15/16 | (2006.01) |
|---|---|
| H04L 12/58 | (2006.01) |
| H04L 12/725 | (2013.01) |
| H04L 12/721 | (2013.01) |
| H04L 12/717 | (2013.01) |
| H04L 29/08 | (2006.01) |

(52) U.S. Cl.
CPC .............. *H04L 51/14* (2013.01); *H04L 45/308* (2013.01); *H04L 45/42* (2013.01); *H04L 45/44* (2013.01); *H04L 67/327* (2013.01); *H04L 51/34* (2013.01); *H04L 67/26* (2013.01)

(58) Field of Classification Search
CPC ..... H04L 12/5855; H04L 51/12; H04L 51/34; H04L 67/26; H04L 67/327; G06F 9/542
USPC ................................................ 709/206, 238
See application file for complete search history.

(56) References Cited

U.S. PATENT DOCUMENTS

| 6,161,006 | A  * | 12/2000 | Balachandran ............... 455/410 |
|---|---|---|---|
| 6,704,795 | B1 | 3/2004 | Fernando et al. |
| 7,181,441 | B2 | 2/2007 | Mandato et al. |
| 7,801,857 | B2 | 9/2010 | Betts et al. |
| 8,600,416 | B2 | 12/2013 | Lin et al. |
| 8,621,035 | B2 | 12/2013 | Li et al. |
| 2002/0143855 | A1 | 10/2002 | Traversat et al. |
| 2003/0115317 | A1 | 6/2003 | Hickson et al. |
| 2003/0189946 | A1 * | 10/2003 | Yajnik et al. ................. 370/428 |
| 2004/0054802 | A1 | 3/2004 | Beauchamp et al. |
| 2004/0205439 | A1 | 10/2004 | Carmeli et al. |
| 2004/0254993 | A1 * | 12/2004 | Mamas ........................ 709/206 |

(Continued)

FOREIGN PATENT DOCUMENTS

JP          2003044407          2/2003

OTHER PUBLICATIONS

Theodore L. Ross, Systems and Methods for Secure Messgae Delivery to a Transient Recipient in a Dynamically Routed Network, U.S. Appl. No. 13/193,015, filed Jul. 28, 2011.

(Continued)

*Primary Examiner* — Jeong S Park
(74) *Attorney, Agent, or Firm* — Lowenstein Sandler LLP

(57) ABSTRACT

Systems and methods are disclosed that provide a single logical broker from the point of view of a message consumer connected to a messaging network. The messaging network implements dynamic routing that adapts to changes in the message preferences of the message consumer and the message consumer's availability throughout the messaging network. In various embodiments, the connection/disconnection of a message consumer and/or changes to message routing criteria at any broker in the network are propagated to all other brokers in the network until the entire network is adapted, such that a message consumer may connect to any broker node and receive the same network service and functionality regardless of connection point.

12 Claims, 7 Drawing Sheets

(56) References Cited

U.S. PATENT DOCUMENTS

| | | | |
|---|---|---|---|
| 2005/0021622 A1* | 1/2005 | Cullen | 709/204 |
| 2005/0152286 A1 | 7/2005 | Betts et al. | |
| 2005/0272412 A1* | 12/2005 | Langsenkamp et al. | 455/414.2 |
| 2006/0168037 A1 | 7/2006 | Audu et al. | |
| 2007/0014302 A1* | 1/2007 | Vincent | 370/401 |
| 2007/0083669 A1 | 4/2007 | Tsirtsis et al. | |
| 2007/0237153 A1* | 10/2007 | Slaughter et al. | 370/392 |
| 2007/0299947 A1 | 12/2007 | El-Damhougy | |
| 2008/0229334 A1 | 9/2008 | Graham et al. | |
| 2009/0125231 A1 | 5/2009 | Ichimura | |
| 2009/0240586 A1 | 9/2009 | Ramer et al. | |
| 2010/0191692 A1 | 7/2010 | Gassewitz et al. | |
| 2010/0241717 A1 | 9/2010 | Hawkins et al. | |
| 2010/0318617 A1 | 12/2010 | Rault et al. | |
| 2011/0066690 A1 | 3/2011 | Ellanti et al. | |
| 2011/0125921 A1* | 5/2011 | Karenos et al. | 709/240 |
| 2011/0145263 A1 | 6/2011 | Sakamoto et al. | |
| 2011/0265164 A1* | 10/2011 | Lucovsky et al. | 726/7 |
| 2011/0269476 A1 | 11/2011 | Kumar | |
| 2011/0292804 A1* | 12/2011 | Dempo | 370/236 |
| 2011/0302275 A1 | 12/2011 | Prodan et al. | |
| 2012/0072548 A1 | 3/2012 | Kim | |
| 2012/0209517 A1 | 8/2012 | Li et al. | |
| 2012/0246337 A1 | 9/2012 | Ross | |
| 2012/0246340 A1 | 9/2012 | Ross | |
| 2013/0031186 A1 | 1/2013 | Ross | |
| 2013/0066936 A1 | 3/2013 | Krishnan et al. | |

OTHER PUBLICATIONS

Theodore L. Ross, "Systems and Methods for Routing Messages Exclusively to Eligible Consumers in a Dynamic Routing Network", U.S. Appl. No. 13/071,277, filed Mar. 24, 2011.

Theodore L. Ross, "Systems and Methods for Identifying Linked Message Brokers in a Dynamic Routing Network", U.S. Appl. No. 13/071,306, filed Mar. 24, 2011.

AMPQ 1.0 Draft Recommendation, http:www.ampq.org/confluence/pages/viewpage.action?pageId=4489238, May 19, 2010, 94 pages.

USPTO, Office Action for U.S. Appl. No. 13/193,015 mailed Jun. 19, 2013.

Theodore L. Ross, "Systems and Methods for Providing Distributed Dynamic Routing Using a Logical Broker," U.S. Appl. No. 13/071,243, filed Mar. 24, 2011.

USPTO Non-Final Office Action for U.S. Appl. No. 13/193,015 mailed Dec. 30, 2013.

USPTO Final Office Action for U.S. Appl. No. 13/193,015 mailed Oct. 24, 2014.

USPTO Non Final Office Action for U.S. Appl. No. 13/071,277 mailed Mar. 13, 2014.

USPTO Non Final Office Action for U.S. Appl. No. 13/071,277 mailed May 22, 2013.

USPTO Final Office Action for U.S. Appl. No. 13/071,277 mailed Aug. 20, 2014.

USPTO Final Office Action for U.S. Appl. No. 13/071,277 mailed Oct. 25, 2013.

USPTO Notice of Allowance for U.S. Appl. No. 13/071,306 mailed Sep. 24, 2014.

USPTO Non Final Office Action for U.S. Appl. No. 13/071,306 mailed May 21, 2014.

USPTO Non Final Office Action for U.S. Appl. No. 13/071,306 mailed Feb. 28, 2013.

USPTO Final Office Action for U.S. Appl. No. 13/071,306 mailed Oct. 21, 2013.

Theodore L. Ross, "Systems and Methods for Secure Message Delivery to a Transient Recipient", U.S. Appl. No. 13/193,015, filed Jul. 28, 2011.

Final Office Action for U.S. Appl. No. 13/193,015 mailed Apr. 9, 2014.

* cited by examiner

PROVIDING DISTRIBUTED DYNAMIC ROUTING USING A LOGICAL BROKER

FIELD

The present invention relates to message routing generally, and more particularly relates to a messaging network that functions as a single logical broker from a client's point of view.

BACKGROUND

In conventional messaging systems, especially conventional message-oriented middleware and enterprise service buses, a message consumer (e.g., a client application) typically receives messages via a particular server that is local to a home location of the message consumer. For example, a message consumer may run on a mobile laptop computer that is typically connected to a server at the company office where the user of the laptop computer works. The message producer (e.g., another application program that together with the client application forms a distributed application) may be hosted on a non-mobile server. In such conventional systems, the communication routes between the message producer(s) and the message consumer(s) brokers are statically defined at system setup, often based on the connections of message consumers who exist at the time that the network is first configured. Subsequently, the communication routes are manually reconfigured by network administrators as needed. For example, when the user of the message consuming application is transferred from one office to another, the network administrator may configure the messaging network to route messages needed by the message consumer to the server at the new office where the user is now located.

Conventional reconfiguring of the messaging network, however, is unsatisfactory when a message consumer is frequently mobile, as in the case of a user (message consumer) who frequently travels from office to office. In this situation, the message consumer will not receive messages when connected to a "non-home" server, until and unless the messaging network is reconfigured to route the consumer's messages to the non-home server. Such reconfiguring is often complicated and time consuming. One possible solution is to configure the messaging system to distribute the consumer's messages to all of the messaging servers in the network, so that the consumer receives messages no matter which server he or she is currently connected to. But this solution has several drawbacks. Among them is an inefficient and unnecessary use of system resources, such as communication bandwidth between messaging servers, as well as processing and storage resources on each individual messaging server, as the system continuously forwards messages to servers that are not connected to the message consumer. Another drawback is increased and unnecessary security risks, as messages traverse communications links between messaging servers, and are stored, at least briefly, on messaging servers in portions of the network that do not lead to the message consumer.

Accordingly, it is desirable to provide systems and methods that address the problems and drawbacks of conventional messaging networks.

DESCRIPTION OF DRAWINGS

The accompanying drawings, which are incorporated in and constitute a part of this specification, illustrate several embodiments of the invention and together with the description, serve to explain the principles of the invention.

DESCRIPTION OF EMBODIMENTS

Figure 1:
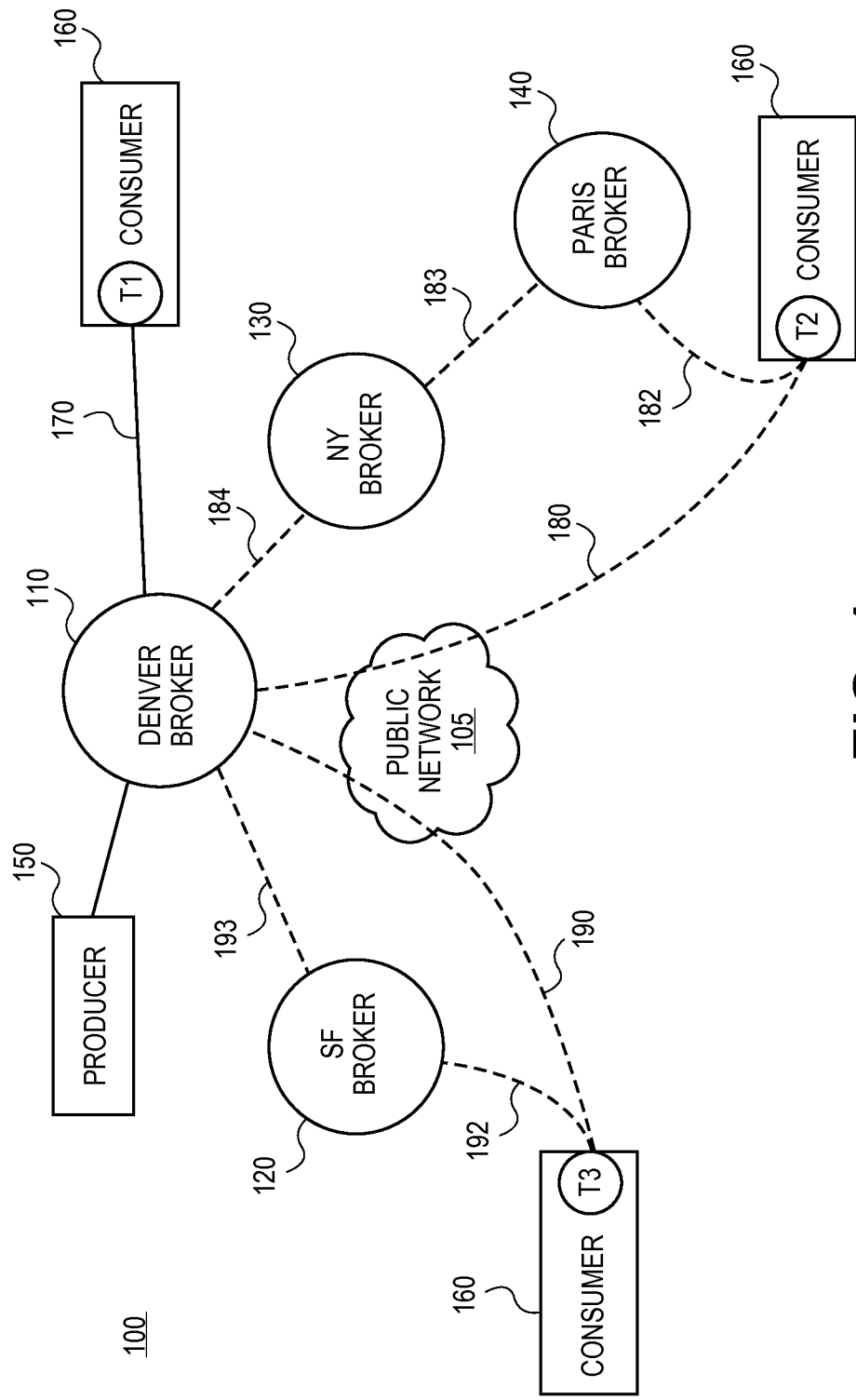
FIG. 1 is a network diagram illustrating some of the drawbacks of a conventional enterprise messaging system.

Reference will now be made in detail to embodiments of the invention, examples of which are illustrated in the accompanying drawings. Wherever convenient, the same reference numbers will be used throughout the drawings to refer to the same or like parts.

Embodiments consistent with the present teachings relate to systems and methods for dynamic messaging routing that include a network of brokers that dynamically keep track of whether and where message consumers are connected to the network, including keeping track of when a connection status changes (e.g., when a consumer connects to, or disconnects from, the network, and the consumer's message acceptance criteria), and route each message only along network paths that lead to a consumer of that message.

In various embodiments, consumers supply message routing criteria to the local broker to which they are connected (or conversely, disconnect from the local broker, which causes the removal of message routing criteria for the disconnected consumer). Brokers in the network coordinate with each other to apply the routing criteria of a destination broker to a source broker, so that any message that would match one of these routing criteria is routed to the destination broker. If routing criteria are added to or removed from the destination broker (including removal caused by the message consumer disconnecting from the network), then these changes are propagated to all connected brokers throughout the network. When a destination broker removes a criteria that allows a specified type of message to pass, the connected brokers follow suit and no longer incur the overhead or security risks of transferring messages that match that criteria.

Because the network dynamically routes messages and dynamically adapts its routing to the actions and status of the message consumer, from the message consumer's point of view, the entire network behaves like a single logical exchange.

According to one embodiment, systems, methods, and computer-readable media are provided for providing a dynamic routing messaging network that functions like a single logical message broker, and which implements functionality comprising: connecting to a message consumer, receiving, from the message consumer, message-identifying information, and configuring, using the computing system, the broker to route messages identified by the message-identifying information to the consumer.

Further embodiments provide systems, methods, and computer-readable media, which perform additional functionality, including disconnecting from the message consumer, and reconfiguring, using the computing system, the broker to cease to route messages to the consumer. Other embodiments perform further additional functionality, including receiving, from the message consumer, additional message-identifying information, and reconfiguring, using the computing system, the broker to route messages identified by the additional message-identifying information to the consumer. Yet other embodiments add functions such as configuring an upstream broker from a downstream broker, wherein the downstream broker is closer to a point where the message consumer is connected to the messaging network. Still other embodiments add functionality such as receiving a message, determining whether the message corresponds to the message-identifying information, and if the message does correspond to the message-identifying information, then routing the message toward the message consumer.

Referring now to the drawings, FIG. 1 is a network diagram illustrating some of the drawbacks of a conventional enterprise messaging system. As shown, enterprise messaging network 100 includes several messaging brokers, including a Denver broker 110 (a broker's name indicates the geographical location of the computing system that implements it), a San Francisco (SF) broker 120, a New York (NY) broker 130, and a Paris broker 140. Enterprise messaging network 100 may represent, for example, the message-oriented middleware of a multi-national organization having offices in San Francisco, Denver, New York, and Paris, France. In various network embodiments, a messaging broker may be implemented by software executing on a server computer or other data processing system.

In the example shown in FIG. 1, a message producer 150 is connected to Denver broker 110. In various networks, producer 150 may be a data processing system, such a laptop or desk top computer, operated by a user, which sends messages. In other networks, producer 150 may be an application or software program running on a data processing system, which sends messages, for example to other applications. Also as shown in FIG. 1, a message consumer 160 is connected to network 100. Consumer 160 may be a data processing system, such a laptop or desk top computer, operated by a user, which may receive messages from producer 150. Alternatively, consumer 160 may be an application or software program running on a data processing system, which receives messages from producer 150.

To illustrate a consumer that is mobile, message consumer 160 is shown connected to various brokers of network 100 at various points in time, where the circled annotation "T1" represents a first point in time, the circled annotation "T2" represents a subsequent second and different time, and the circled annotation "T3" represents a third and different time. Thus, at time T1, consumer 160 is connected to Denver broker 110, as indicated by connection 170. At time T2, consumer 160 may be connected to Denver broker 110, as indicated by potential connection 180, which utilizes public network 105, or it may be connected to Paris broker 140, as indicated by potential connection 182. And, at time T3, consumer 160 may be connected to Denver broker 110, as indicated by potential connection 190, which utilizes public network 105, or it may be connected to SF broker 120, as indicated by potential connection 192.

In the example shown, at time T1, consumer 160 is connected to its "home" server, which implements Denver broker 110. Denver broker 110 is configured to receive a message from producer 150 that is destined for consumer 160, and either provide the message to consumer 160 via connection 170 (when consumer 160 is currently connected), or store the message until consumer 160 connects to Denver broker 110 (when consumer 160 is not currently connected).

At time T2, consumer 160 is located in Paris—for example, in the case where a user brings a laptop computer that executes a message consumer application on a business trip. From Paris, consumer 160 may connect directly to Denver broker 110, as illustrated by potential connection 180, in order to receive messages from producer 150. But, there are several drawbacks to doing so. Among the well-known drawbacks are the increased security risks, increased cost, and decreased reliability associated with utilizing public network 105 to transport messages.

Alternatively, consumer 160 may connect directly to the local Paris broker 140, as illustrated by potential connection 182. Because Paris broker 140 is part of the private enterprise messaging network 100, the drawbacks of using public network 105 are avoided. Connecting to Paris broker 140 presents its own drawbacks, however. In particular, consumer 160 cannot receive messages from producer 150 at Paris broker 140 because network 110 is not configured to route the messages meant for consumer 160 to Paris broker 140. In order to receive message from producer 150, a system administrator must configure Denver broker 110 to forward appropriate messages to NY broker 130, as shown by potential connection 184, and configure NY broker 130 to then forward the appropriate messages to Paris broker 140, as shown by potential connection 183.

Another problem occurs when consumer 160 leaves Paris, because unless a system administrator reconfigures Denver broker 110 and NY broker 130 to cease forwarding appropriate messages to Paris broker 140 after consumer 160 leaves Paris, they will continue to do so, wasting bandwidth and processing resources, and increasing security risks.

At time T3, consumer 160 is located in San Francisco. Similar to the Paris situation, from San Francisco, consumer 160 may connect directly to Denver broker 110, as illustrated by potential connection 190 or connect locally to SF broker 192 via potential connection 192, also setting up potential connection 193 between SF broker 120 and Denver broker 110, in order to receive messages from producer 150. The drawbacks of both options are similar to the drawbacks explained with respect to the Paris location.

Figure 2A:
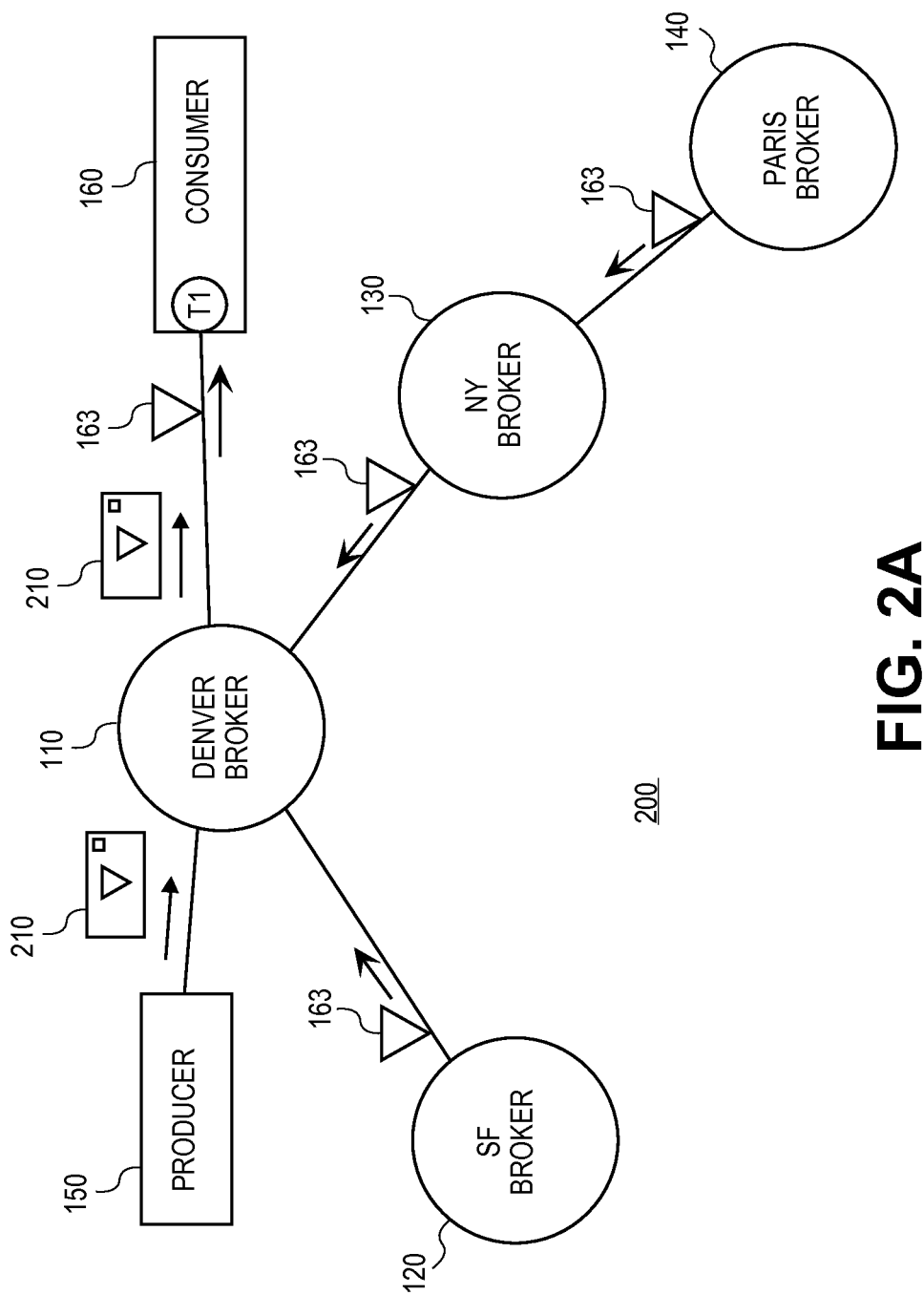
FIGS. 2A-2C are diagrams showing a network of message brokers illustrating an exemplary messaging system consistent with embodiments of the invention.
Figure 2B:
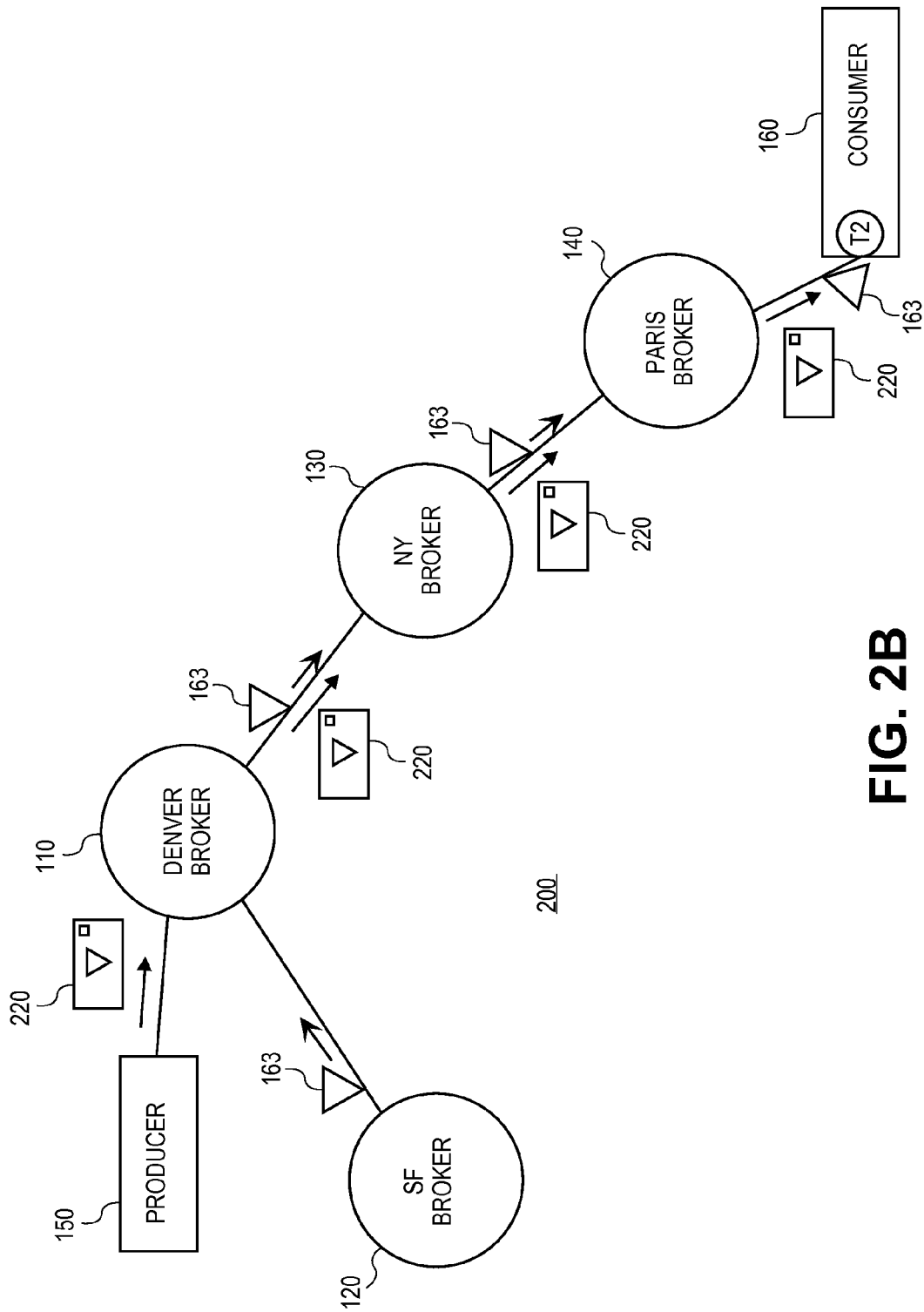
Figure 2C:
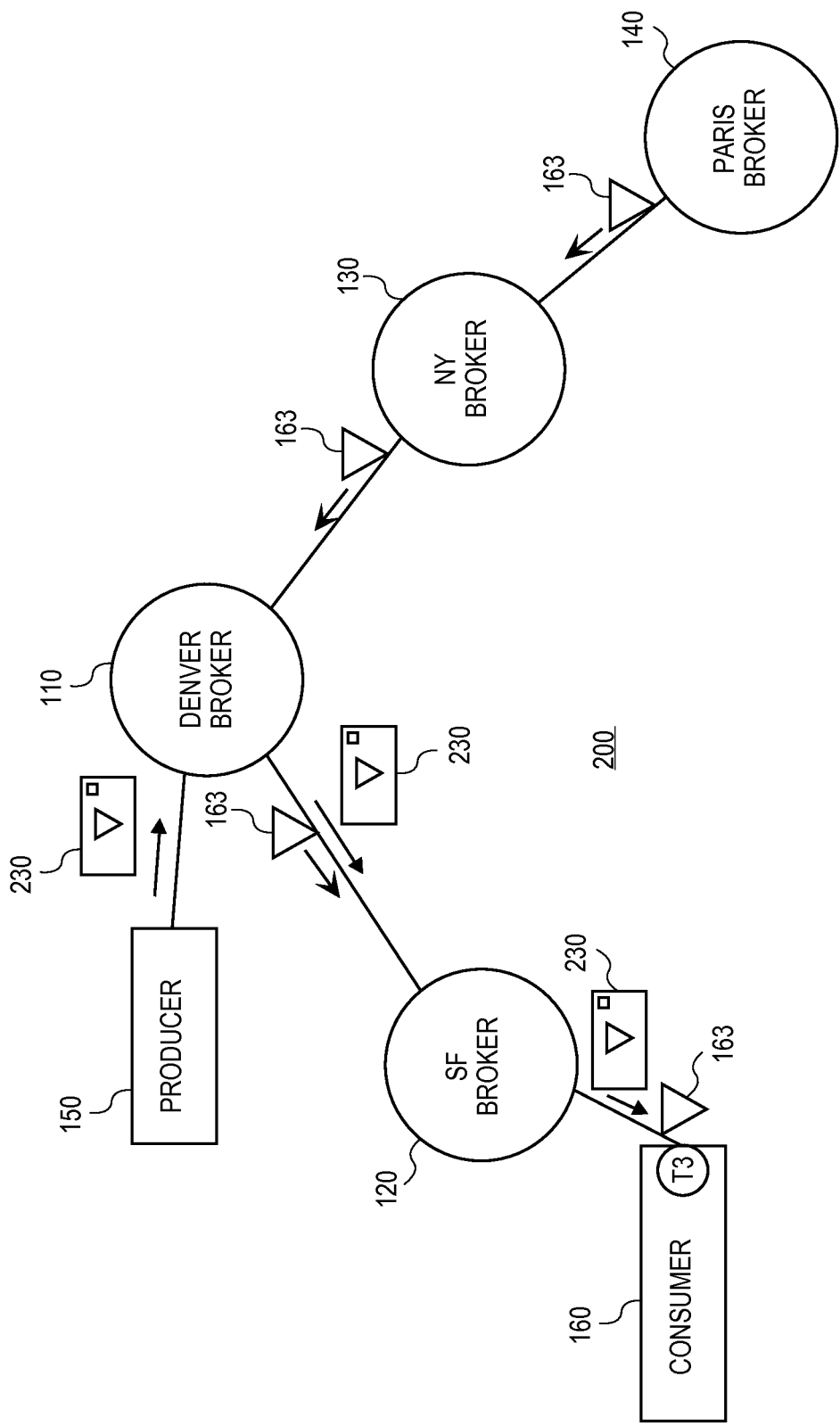

FIGS. 2A-2C are diagrams showing an improved network 200 of message brokers illustrating an exemplary messaging system consistent with embodiments of the invention, which does not suffer the aforementioned drawbacks. In the embodiment shown in FIGS. 2A-2C, the brokers of network 200 are configured to implement a messaging system that dynamically routes a message to a consumer(s) of that message regardless of where the consumer is connected to network 200. U.S. patent application Ser. No. 13/071,306 entitled "Systems and Methods for Identifying Linked Message Brokers in a Dynamic Routing Network," by Theodore Ross filed on Mar. 24, 2011, (which is hereby incorporated by reference in its entirety), describes in detail embodiments of brokers that are configured to route a messages to a consumer(s) of that message regardless of where the consumer is connected to the messaging network. In addition, U.S. patent application Ser. No. 13/071,277 entitled "Systems and Methods for Routing Messages Exclusively to Eligible Consumers in a Dynamic Routing Network," by Theodore Ross filed on Mar. 24, 2011 (which is hereby incorporated by reference in its entirety), describes further features of a dynamic routing network.

As shown in FIG. 2A, and similar to FIG. 1 for ease of explanation, messaging network 200 is formed of interconnected messaging brokers, including Denver broker 110, which is communicatively connected to SF broker 120 and NY broker 130. NY broker 130 is communicatively connected to Paris broker 140.

As shown, a producer 150 of messages is communicatively connected to Denver broker 110. In various embodiments, message producer 150 may be a data processing system, such as a laptop or desk-top computer, operated by a user, which sends messages. In other embodiments, producer 150 may be an application or software program running on a data processing system, which sends messages.

As shown in FIG. 2A, a message consumer 160 is connected to Denver broker 110 at time T1. Consumer 160 may be a data processing system, such a laptop or desk-top computer, operated by a user, which may receive appropriate messages from producer 150. Alternatively, consumer 160 may be an application or software program running on a data processing system, which may receive appropriate messages from producer 150. Consumer 160 provides message-matching criteria 163 to Denver broker 110, for example, during initial connection or when consumer 160 wishes to specify or change the description of the messages that are to be routed to it. Message-matching criteria 163 specifies attributes or characteristics of messages that consumer 160 will receive. In other words, message-matching criteria 163 is information that can be used to identify specific messages that flow through messaging network 200, and message-matching criteria 163 defines the messages consumer 160 wants to receive and will consume. In an exemplary implementation based on modifications and improvements to an advanced message queuing protocol (AMQP) messaging system, message-matching criteria 163 is similar to the binding key(s) specifying the message(s) that consumer 160 is subscribing to.

According to the embodiment shown in FIG. 2A, when consumer 160 provides message-matching criteria 163 to Denver broker 110, Denver broker 110 propagates message-matching criteria 163 to the brokers it is connected to: in this case, SF broker 120 and NY broker 130. NY broker 130, in turn, propagates message-matching criteria 163 to the broker that it is connected to, namely Paris broker 140. In sum, each broker propagates message-matching criteria 163 to the brokers that are downstream of them (with respect to the source broker that first received message-matching criteria 163 from consumer 160) until all the brokers in network 200 receive message-matching criteria 163.

As message-matching criteria 163 propagates through network 200, the brokers in network 200 configure themselves (e.g., by modifying their routing information) to forward messages that they receive and that correspond to message-matching criteria 163 toward consumer 160, wherever consumer 160 is currently connected. Because each broker receives message-matching criteria 163 from the broker upstream of it in the direction through network that leads to wherever consumer 160 is currently connected, each broker knows in which direction to route messages that correspond to message-matching criteria 163 so that the messages reach consumer 160. This is represented in FIG. 2A by the arrows near each broker accompanied by the triangle representing message-matching criteria 163.

As noted above, the process for propagating message-matching criteria throughout the network whenever a consumer connects or disconnects to the network and for configuring the brokers to route messages to appropriate consumers is described in detail in the U.S. patent application entitled "Systems and Methods for Identifying Linked Message Brokers in a Dynamic Routing Network," by Theodore Ross filed on Mar. 24, 2011, (which is incorporated herein by reference), with additional features described in U.S. patent application Ser. No. 13/071,277 entitled "Systems and Methods for Routing Messages Exclusively to Eligible Consumers in a Dynamic Routing Network," by Theodore Ross filed on Mar. 24, 2011, (which is hereby incorporated herein by reference).

In the example shown in FIG. 2A, producer 150 sends a message 210 to Denver broker 110, for routing to consumer 160. Producer 150 includes with message 210 an attribute which matches or otherwise corresponds to the message-matching criteria 163 specified by consumer 160. This is represented in FIG. 2A by the triangle in message 210, which matches the triangle used to represent message-matching criteria 163.

Upon receipt, Denver broker 110 analyzes message 210, including any accompanying metadata if necessary, and determines whether message 210 corresponds to message-matching criteria 163 of consumer 160. Upon determining that message 210 corresponds to message-matching criteria 163, Denver broker 110 supplies message 210 to consumer 160, which at time T1 is directly connected to Denver broker 110.

FIG. 2B shows messaging network 200 at time T2, after consumer 160 has disconnected from Denver broker 110 and connected to Paris broker 140. When consumer 160 first connects to Paris broker 140, it supplies message-matching criteria 163 to Paris broker 140, and Paris broker 140 passes message-matching criteria 163 downstream, so that it propagates to each broker in network 200. As shown in FIG. 2B by the new direction of the arrows with the triangles labeled 163, each broker has been configured to route messages corresponding to message-matching criteria 163 toward Paris broker 140, where consumer 160 is currently connected at time T2.

Accordingly, when producer 150 publishes a message 220 to Denver broker 110, Denver broker 110 analyzes message 220, including any accompanying metadata, and determines whether message 220 corresponds to message-matching criteria 163 of consumer 160. Upon determining that message 220 corresponds to message-matching criteria 163 (as symbolized by the triangle in message 220), Denver broker 110 routes message 220 to NY broker 130, which performs a similar analysis and routes message 220 to Paris broker 140. Paris broker 140 supplies message 220 to consumer 160, which at time T2 is directly connected to Paris broker 140.

FIG. 2C shows messaging network 200 at time T3, after consumer 160 has disconnected from Paris broker 140 and connected to SF broker 120. When consumer 160 first connects to SF broker 120, it supplies message-matching criteria 163 to SF broker 120, and SF broker 120 passes message-matching criteria 163 downstream, so that it propagates to each broker in network 200. As shown in FIG. 2C by the new direction of the arrows with the triangles labeled 163, each broker has been configured to route messages corresponding to message-matching criteria 163 toward SF broker 120, where consumer 160 is currently connected at time T3.

Accordingly, when producer 150 transmits a message 230 to Denver broker 110, Denver broker 110 analyzes message 230, including any accompanying metadata if necessary, and determines whether message 230 corresponds to message-matching criteria 163 of consumer 160. Upon determining that message 230 corresponds to message-matching criteria 163 (as symbolized by the triangle in message 230), Denver broker 110 routes message 230 to SF broker 120 according to the new dynamic routing information that reconfigured network 200 when consumer 160 connected or disconnected from a broker node. SF broker 120 performs a similar analysis and routes message 230 to consumer 160, which at time T3 is directly connected to SF broker 120.

In some embodiments, messaging network 200 may be implemented as a direct matching system, wherein metadata associated with messages, and/or data in the contents of messages, must exactly match the message-matching criteria 163 in order to be routed to consumer 1160. Metadata may include information in, for example, a routing key(s) attached to a message or information in a header or in a property field that provides an "envelope" for the contents of a message. In various embodiments, message-matching criteria 163 may specify the value or information that must be matched in order to route a message, and specify where to find the relevant value or information—e.g., in a particular header, in a particular property field, in a specific portion of the message contents, etc. In other words, message-matching criteria 137 informs a broker how to identify a message that should be routed to the message consumer; e.g., where to look (e.g., routing key, message header, message contents, etc.) to find the information needed to identify the message, as well as what to look for (e.g., what the value of field must be to match).

Unlike conventional network 100 of FIG. 1, each broker in network 200, including brokers that are not currently directly connected to consumer 160, is aware of the messages that consumer 160 wishes to receive, and knows how to route such messages toward the broker to which consumer is currently attached. Also unlike network 100, the information in network 200 for routing messages to consumer 160 changes dynamically as the status (e.g., the connection point and/or message-matching criteria) of consumer 160 changes. Thus, regardless of where consumer 160 connects to network 200, messages will be properly routed to consumer 160 as if it were connected to its "home" broker, because the brokers dynamically reconfigure themselves and dynamically route messages in conformance with connection and/or message selection changes made by the message consumer 160. Thus to a message consumer, connecting to any broker in network 200 is the same as connecting to any other broker, in terms of functionality and information that must be supplied, such that the entire network appears to be a single logical broker.

One of ordinary skill will recognize that the topology, producer connections, consumer connections, and other details of messaging network 200 are exemplary and presented in the form shown for conciseness and ease of illustration. Other components, topologies, connections, etc. may be substituted for those shown without departing from the scope of the invention. In addition, one of ordinary skill will recognize that for implementations with two-way communications, consumer 160 may also be a producer/publisher of messages bound for producer 150, and producer 150 may also be a consumer of messages published by consumer 160. In addition, one of ordinary skill will recognize that messaging networks consistent with the principles of the invention may be implemented by improving, adding functionality to, or modifying known message-oriented middleware systems, such as advanced message queuing protocol (AMQP) systems, RestMS systems, Java Messaging Service (JMS), Microsoft Message Queue (MSMQ), and Size-Prefixed Blob (SPB) systems, and the like.

Figure 3:
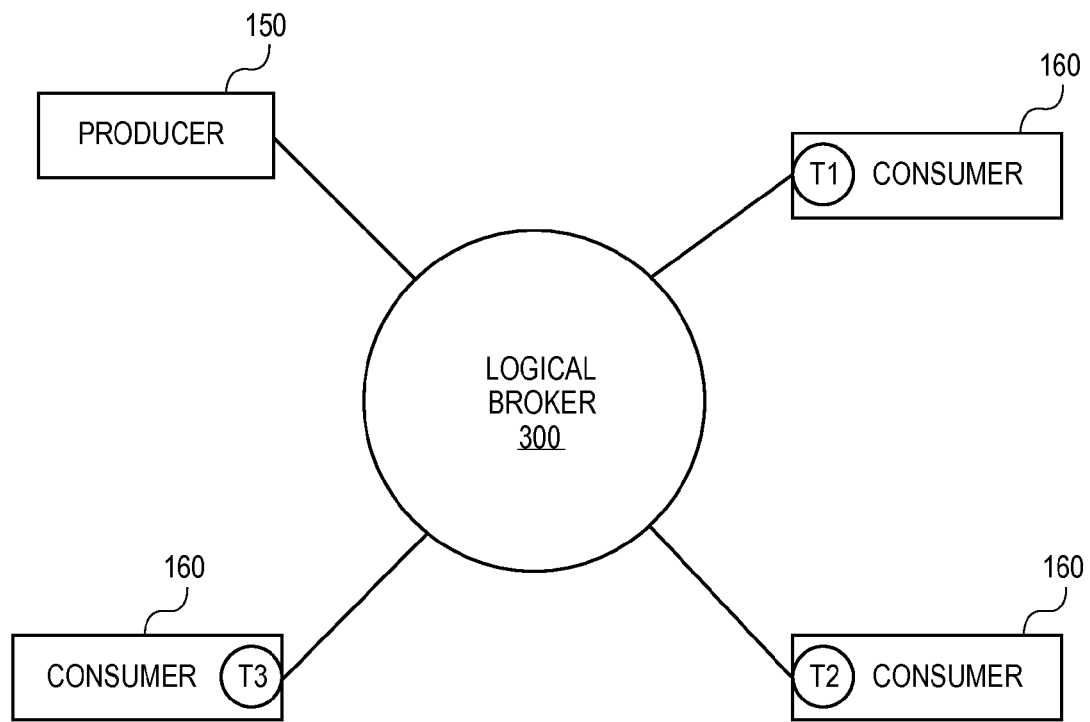
FIG. 3 is a diagram showing an exemplary logical broker consistent with embodiments of the invention.

FIG. 3 is a diagram showing an exemplary logical broker 300 consistent with embodiments of the invention. As shown, messaging network 200 of FIGS. 2A-2C is represented by logical broker 300. FIG. 3 shows consumer 160 connected to logical broker 300 at times T1, T2, and T3. As explained with respect to FIGS. 2A-2C, network 200 functions as a single logical broker 300 from the point of view of consumer 160, regardless of the broker to which consumer 160 connects at any given time.

For example, in the context of an implementation that improves an AMQP-based messaging network, from the client message consumer's point of view, all of the brokers in the network collectively offer a single logical exchange that behaves the same as a single exchange in a single broker. Each client connects to its local broker and can bind its queues to a distributed logical exchange and publish messages to the exchange.

Further in the context of an implementation that improves an AMQP-based messaging network, when a consuming client (e.g., consumer 160) binds a queue to a dynamic routing exchange in a broker (e.g., broker 110, 120, 130, or 140), information about that binding is propagated to the other brokers in the network to ensure that any messages matching the binding will be forwarded to the client's local broker. Messages published to any dynamic routing exchange in any broker in the network are forwarded to other brokers only if there is a remote consumer to receive the messages. The routing protocol protocol associated with the dynamic binding information ensures that messages are routed only to brokers with eligible consumers. This includes network topologies where messages must make multiple hops to reach the consumer. The resultant effect is that the network functions as a single logical broker from the client message consumer's perspective.

Figure 4:
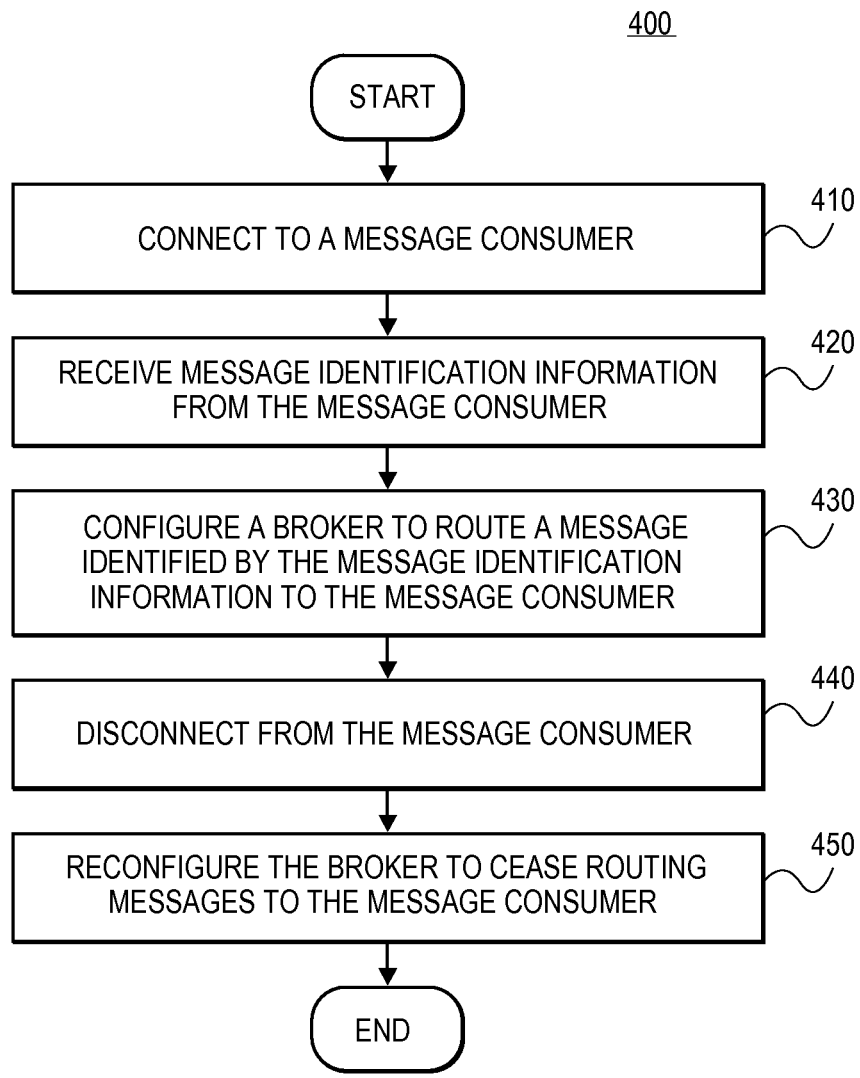
FIG. 4 is a flowchart showing an exemplary process for implementing a logical broker, consistent with embodiments of the invention.

FIG. 4 is a flowchart showing an exemplary process for implementing a logical broker, consistent with embodiments of the invention. In various embodiments, process 400 may be implemented by a server computer, or other data processing system, functioning as a message broker, such as brokers 110, 120, 130, or 140 of FIG. 2. In the embodiment shown in FIG. 4, process 400 begins by connecting to a message consumer (stage 410).

Process 400 continues by receiving message identification information from the message consumer (stage 420). In some embodiments, the message identification information may comprise message-matching criteria, as described with respect to FIG. 2.

At stage 430, process 400 configures a broker to route a message identified by the message identification information to the message consumer. In various embodiments, this stage may comprise configuring a message broker to provide messages to the message consumer that is directly connected to it. In some embodiments, this stage may comprise propagating the message identification information to another broker in the messaging network, such that the other broker routes a message identified by the message identification information toward the message consumer.

Next, process 400 disconnects from the message consumer (stage 440). In various embodiments, this stage may occur at the option of the message consumer.

At stage 450, in response to the disconnection at stage 440, process 400 reconfigures the broker so that the broker ceases routing messages to the former connection broker of the message consumer. In various embodiments, stage 450 may comprise configuring a message broker to cease provide messages to the message consumer because the message consumer is no longer directly connected to it. In some embodiments, this stage may comprise propagating, to another broker in a messaging network, information indicating that the message consumer is no longer connected, such that the other broker ceases to route message identified by the message identification information toward the message consumer's former connection point.

One of ordinary skill will recognize that stages may be added to, deleted from, or modified within process 400 without departing from the principles of the invention. For example, additional processing stages may be added to dynamically configure routing by all brokers connected to a broker implementing process 400 when a message consumer connects, and to reconfigure those brokers when the message consumer disconnects.

Figure 5:
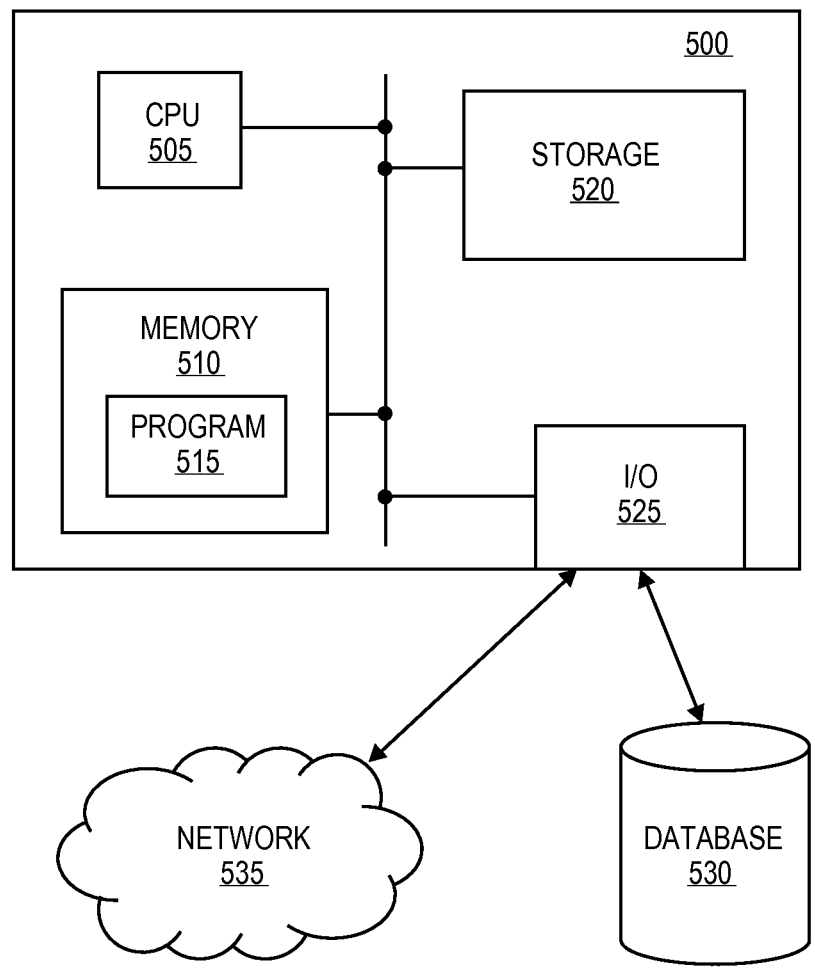
FIG. 5 is a block diagram of an exemplary computing system that may be used to implement embodiments consistent with the invention.

FIG. 5 is a block diagram of an exemplary computing system or data processing system 500 that may be used to implement embodiments consistent with the invention, such as for example, embodiments of messaging brokers, consumers and/or producers. The exact components and arrangement, however, are not critical to the invention. Computing system 500 includes a number of components, such as a central processing unit (CPU) 505, a memory 510, an input/output (I/O) device(s) 525, and a nonvolatile storage device 520. System 500 can be implemented in various ways. For example, an implementation as an integrated platform (such as a workstation, personal computer, laptop, etc.) may comprise CPU 505, memory 510, nonvolatile storage 520, and I/O devices 525. In such a configuration, components 505, 510, 520, and 525 may connect and communicate through a local data bus and may access a database 580 (implemented, for example, as a separate database system) via an external I/O connection. I/O component(s) 525 may connect to external devices through a direct communication link (e.g., a hard-wired or local wifi connection), through a network, such as a local area network (LAN) or a wide area network (WAN) and/or through other suitable connections. System 500 may be standalone or it may be a subsystem of a larger system.

CPU 505 may be one or more known processors or processing devices, such as a microprocessor from the Core™ 2 family manufactured by Intel™ Corporation (San Jose, Calif.) or the Athlon™ family manufactured by AMDT™ Corporation (Sunnyvale, Calif.). Memory 510 may be one or more fast storage devices configured to store instructions and information used by CPU 505 to perform certain functions and processes related to embodiments of the present invention. Storage 520 may be a volatile or non-volatile, magnetic, semiconductor, tape, optical, or other type of storage device or computer-readable medium, including devices meant for long-term storage.

In the illustrated embodiment, memory 510 contains one or more programs or subprograms 515 loaded from storage 520 that, when executed by CPU 505, perform various procedures, processes, or methods consistent with the present invention. Alternatively, CPU 505 may execute one or more programs located remotely from system 500. For example, system 500 may access one or more remote programs via a network 535 that, when executed, perform functions and processes related to or implementing embodiments of the present invention.

In one embodiment, memory 510 may include a computer program 515 that implements process 400. Memory 510 may also include other programs or applications that implement other methods and processes that provide ancillary functionality for a broker, consumer, or producer.

Methods and systems consistent with the invention are not limited to programs or computers configured to perform dedicated tasks. For example, memory 510 may be configured with a program 515 that performs several functions when executed by CPU 505. For example, memory 510 may include a single program 515 that implements both process 400 and the functionality of a message producer or the functionality of a network manager.

Memory 510 may be also be configured with other programs (not shown) unrelated to the invention and/or an operating system (not shown) that performs several functions well known in the art when executed by CPU 505. By way of example, the operating system may be Microsoft Windows™, Unix™, Linux™, an Apple Computers™ operating system, Personal Digital Assistant operating system such as Microsoft CE™, or other operating system. The choice of operating system, and even the use of an operating system, is not critical to the invention.

I/O device(s) 525 may comprise one or more input/output devices that allow data to be received and/or transmitted by system 500. For example, I/O device 525 may include one or more input devices, such as a keyboard, touch screen, mouse, and the like, that enable data to be input from a user, such as a system operator. Further, I/O device 525 may include one or more output devices, such as a display screen, CRT monitor, LCD monitor, plasma display, printer, speaker devices, and the like, that enable data to be output or presented to a user. I/O device 525 may also include one or more digital and/or analog communication input/output devices that allow computing system 500 to communicate, preferably digitally, with other machines, computing systems and devices, such as network communication ports, etc. The configuration and number of input and/or output devices incorporated in I/O device 525 are not critical to the invention.

In the embodiment shown, system 500 is connected to a network 535 (e.g., the Internet or a private network), which may in turn be connected to various systems and computing machines (not shown), such as computers that are brokers, consumers, or producers. In general, system 500 may input data (including messages) from external machines and devices and output data (including messages) to external machines and devices via network 535.

In the exemplary embodiment shown in FIG. 5, database 530 is a standalone database external to system 500. In other embodiments, database 530 may be hosted by system 500. In various embodiments, database 530 may manage and store data used to implement systems and methods consistent with the invention. For example, database 530 may manage and store data structures that contain subscription information, message-matching criteria, routing information, link information, network connection information, and the like.

Database 530 may comprise one or more databases that store information and are accessed and/or managed through system 500. By way of example, database 530 may be an Oracle™ database, a Sybase™ database, or other relational database. Systems and methods consistent with the invention, however, are not limited to separate data structures or databases, or even to the use of a database or data structure.

The foregoing description is illustrative, and variations in configuration, implementation, and embodiment of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method comprising:
receiving, by an upstream broker of a plurality of brokers from a first downstream broker of the plurality of brokers over a first communications link, first message-identifying information of a message consumer, wherein the first downstream broker is closer than the upstream broker to a point where the message consumer is connected to the plurality of brokers;
configuring, using a processing unit and in response to receiving the first message-identifying information over the first communications link, routing information stored by the upstream broker to route received messages corresponding to the first message-identifying information to the first downstream broker over the first communication link;

receiving a message from a message producer;
determining that the message is identified by the first message-identifying information;
routing, in response to determining that the message is identified by the first message-identifying information, the message to the first downstream broker according to the stored routing information;
receiving, by the upstream broker from a second downstream broker of the plurality of brokers over a second communications link, second message-identifying information of the message consumer, wherein the second communications link differs from the first communications link, and wherein the second message-identifying information differs from the first message-identifying information; and
reconfiguring, using the processing unit and in response to receiving the second message-identifying information over the second communications link, the routing information stored by the upstream broker to route received messages corresponding to the second message-identifying information to the second downstream broker over the second communications link.

2. The method of claim 1, further comprising:
receiving an indication that the message consumer has disconnected from the plurality of brokers;
reconfiguring, using the processing unit, the routing information stored by the upstream broker to cease to route messages identified by the first message-identifying information to the first downstream broker over the first communications link; and
reconfiguring, using the processing unit, the routing information stored by the upstream broker to cease to route messages identified by the second message-identifying information to the second downstream broker over the second communications link.

3. The method of claim 1, wherein the first downstream broker is directly connected to the message consumer.

4. The method of claim 1, wherein the message is in AMQP format.

5. A system comprising:
a memory to store routing information; and
a processing unit operatively coupled to the memory, the processing unit to:
receive, by an upstream broker of a plurality of brokers from a first downstream broker of the plurality of brokers over a first communications link, first message-identifying information of a message consumer, wherein the first downstream broker is closer than the upstream broker to a point where the message consumer is connected to the plurality of brokers;
configure, in response to receiving the first message-identifying information over the first communications link, the routing information to route received messages corresponding to the first message-identifying information to the downstream broker over the first communication link;
receive a message from a message producer;
determine that the message is identified by the first message-identifying information;
route, in response to determining that the message is identified by the first message-identifying information, the message to the first downstream broker according to the routing information;
receive, by the upstream broker from a second downstream broker of the plurality of brokers over a second communications link, second message-identifying information of the message consumer, wherein the second communications link differs from the first communications link, and wherein the second message-identifying information differs from the first message-identifying information; and
reconfigure, in response to receiving the second message-identifying information over the second communications link, the routing information stored by the upstream broker to route received messages corresponding to the second message-identifying information to the second downstream broker over the second communications link.

6. The system of claim 5, wherein the processing unit is further to:
receive an indication that the message consumer has disconnected from the plurality of brokers;
reconfigure the routing information to cease to route messages identified by the first message-identifying information to the first downstream broker over the first communications link; and
reconfigure the routing information to cease to route messages identified by the second message-identifying information to the second downstream broker over the second communications link.

7. The system of claim 5, wherein the first downstream broker is directly connected to the message consumer.

8. The system of claim 5, wherein the message is in AMQP format.

9. A non-transitory computer-readable medium having instructions encoded thereon that, when executed by a processing unit, cause the processing unit to:
receive, by an upstream broker of a plurality of brokers from a first downstream broker of the plurality of brokers over a first communications link, first message-identifying information of a message consumer, wherein the downstream broker is closer than the upstream broker to a point where the message consumer is connected to the plurality of brokers;
configure, using the processing unit in response to receiving the first message-identifying information over the first communications link, routing information stored by the upstream broker to route received messages corresponding to the first message-identifying information to the first downstream broker over the first communications link;
receive a message from a message producer;
determine that the message is identified by the first message-identifying information;
route, in response to determining that the message is identified by the first message-identifying information, the message to the downstream broker according to the stored routing information;
receive, by the upstream broker from a second downstream broker of the plurality of brokers over a second communications link, second message-identifying information of the message consumer, wherein the second communications link differs from the first communications link, and wherein the second message-identifying information differs from the first message-identifying information; and
reconfigure, using the processing unit and in response to receiving the second message-identifying information over the second communications link, the routing information stored by the upstream broker to route received messages corresponding to the second message-identifying information to the second downstream broker over the second communications link.

10. The non-transitory computer-readable medium of claim 9, the instructions further causing the processing unit to:
- receive an indication that the message consumer has disconnected from the plurality of brokers;
- reconfigure, using the processing unit, the routing information stored by the upstream broker to cease to route messages identified by the first message-identifying information to the first downstream broker over the first communications; and
- reconfigure, using the processing unit, the routing information stored by the upstream broker to cease to route messages identified by the second message-identifying information to the second downstream broker over the second communications link.

11. The non-transitory computer-readable medium of claim 9, wherein the first downstream broker is directly connected to the message consumer.

12. The non-transitory computer-readable medium of claim 9, wherein the message is in AMQP format.

* * * * *